US010963642B2

(12) United States Patent
Douglas et al.

(10) Patent No.: US 10,963,642 B2
(45) Date of Patent: Mar. 30, 2021

(54) INTELLIGENT ASSISTANT HELP SYSTEM

(71) Applicant: Microsoft Technology Licensing, LLC, Redmond, WA (US)

(72) Inventors: Malia Douglas, Seattle, WA (US); Eric Ross Freistadt, Seattle, WA (US); Joan Li, Seattle, WA (US); Karl Rolando Henderson, Jr., Bellevue, WA (US); Sidharth Sehgal, Bellevue, WA (US); Mark Rubinstein, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 921 days.

(21) Appl. No.: 15/362,546

(22) Filed: Nov. 28, 2016

(65) Prior Publication Data
US 2018/0150571 A1 May 31, 2018

(51) Int. Cl.
*G06F 40/30* (2020.01)
*G06F 40/289* (2020.01)
(Continued)

(52) U.S. Cl.
CPC ........ *G06F 40/289* (2020.01); *G06F 16/9032* (2019.01); *G06F 40/30* (2020.01);
(Continued)

(58) Field of Classification Search
CPC ............ G06F 16/9032; G06F 17/2775; G06F 17/2785; G06Q 10/06; G06Q 10/063112;
(Continued)

(56) References Cited

U.S. PATENT DOCUMENTS 6,021,403 A * 2/2000 Horvitz ................... G06N 5/00
706/45
7,444,319 B1 * 10/2008 Sathyanarayan ... G06F 16/9535
(Continued)

OTHER PUBLICATIONS

Xiang, et al., "Modeling relationship strength in online social networks", In Proceedings of World Wide Web, Apr. 26, 2010, pp. 981-990.
(Continued)

*Primary Examiner* — Mark D Featherstone
*Assistant Examiner* — Navneet Gmahl
(74) *Attorney, Agent, or Firm* — International IP Law Group, PLLC

(57) ABSTRACT

Representative embodiments disclose intelligent help systems that monitor user interactions through email, digital assistants, and other applications and recognize when a user can utilize the help of an expert with a task. The system detects user intent and a category of problem from the interactions (i.e., email communications, etc.) and searches a database of user profiles to find experts with the proper expertise to help the user with the category of problem. User intent can be detected by parsing communications, extracting features from the communications, and using the extracted features to identify intent, such as through matching or machine learning. A social score and an expertise score are calculated for expert profiles from the database. The social score is based on a degree of separation and expert and the expertise score is based on a level of expertise. Experts and areas of commonality are presented to the user.

19 Claims, 8 Drawing Sheets

(51) Int. Cl.
*H04L 29/08* (2006.01)
*H04L 12/58* (2006.01)
*G06Q 10/06* (2012.01)
*G06Q 10/10* (2012.01)
*G06F 16/9032* (2019.01)

(52) U.S. Cl.
CPC ..... *G06Q 10/06* (2013.01); *G06Q 10/063112* (2013.01); *G06Q 10/10* (2013.01); *H04L 51/02* (2013.01); *H04L 51/32* (2013.01); *H04L 67/22* (2013.01); *H04L 67/306* (2013.01)

(58) Field of Classification Search
CPC ......... G06Q 10/10; H04L 51/02; H04L 51/32; H04L 67/22; H04L 67/306
See application file for complete search history.

(56) References Cited

U.S. PATENT DOCUMENTS

| | | | |
|---|---|---|---|
| 8,266,098 B2 | 9/2012 | Hu et al. | |
| 8,356,038 B2 | 1/2013 | Torrens et al. | |
| 8,984,076 B1 | 3/2015 | Goldman | |
| 9,170,993 B2 | 10/2015 | Kalia et al. | |
| 10,380,629 B2* | 8/2019 | Amin | G06Q 30/0251 |
| 2008/0155030 A1* | 6/2008 | Fortier | H04L 51/04 |
| | | | 709/206 |
| 2009/0106645 A1* | 4/2009 | Knobel | G06F 16/4393 |
| | | | 715/236 |
| 2009/0307205 A1* | 12/2009 | Churchill | G06F 16/9535 |
| 2010/0070529 A1* | 3/2010 | Gokturk | G06Q 30/02 |
| | | | 707/780 |
| 2010/0174712 A1* | 7/2010 | Li | G06F 16/335 |
| | | | 707/736 |
| 2011/0016421 A1 | 1/2011 | Krupka et al. | |
| 2011/0106892 A1 | 5/2011 | Nelson et al. | |
| 2012/0016678 A1* | 1/2012 | Gruber | G10L 15/22 |
| | | | 704/275 |
| 2012/0084248 A1 | 4/2012 | Gavrilescu | |
| 2013/0007648 A1 | 1/2013 | Gamon et al. | |
| 2013/0268543 A1* | 10/2013 | Andler | G06F 16/435 |
| | | | 707/748 |
| 2013/0275164 A1* | 10/2013 | Gruber | G10L 17/22 |
| | | | 705/5 |
| 2014/0082072 A1 | 3/2014 | Kass et al. | |
| 2014/0149441 A1* | 5/2014 | Wang | G06F 16/903 |
| | | | 707/758 |
| 2014/0214818 A1* | 7/2014 | Du | G06Q 10/063112 |
| | | | 707/723 |
| 2015/0205782 A1 | 7/2015 | Subramanya et al. | |
| 2015/0278370 A1 | 10/2015 | Stratvert et al. | |
| 2016/0110372 A1* | 4/2016 | Cho | G06F 16/9537 |
| | | | 707/724 |
| 2016/0119477 A1* | 4/2016 | Sharpe | H04W 4/21 |
| | | | 379/265.09 |
| 2016/0179805 A1* | 6/2016 | Bolshinsky | G06F 16/951 |
| | | | 707/723 |
| 2016/0219003 A1 | 7/2016 | Kumar et al. | |
| 2016/0246885 A1* | 8/2016 | Aravamudhan | G06F 16/9535 |
| 2017/0031915 A1* | 2/2017 | Moxon | G06F 16/24578 |
| 2017/0091193 A1* | 3/2017 | Li | G06Q 50/01 |
| 2017/0091629 A1* | 3/2017 | Li | G06F 16/9535 |
| 2017/0249388 A1* | 8/2017 | Alonso | G06Q 10/06 |
| 2017/0316515 A1* | 11/2017 | Varma | H04L 67/125 |
| 2017/0337261 A1* | 11/2017 | Wang | G06N 5/022 |
| 2018/0052916 A1* | 2/2018 | Abebe | G06F 16/9535 |
| 2018/0232817 A1* | 8/2018 | Isaacson | G06Q 30/0613 |
| 2019/0230070 A1* | 7/2019 | Isaacson | G06F 3/048 |

OTHER PUBLICATIONS

Ma, et al., "Recommender systems with social regularization", In Proceedings of the Forth International Conference on Web Search and Web Data Mining, Feb. 9, 2011, pp. 287-296.

"Turn emails into tasks", Published on: Dec. 4, 2015 Available at: https://asana.com/guide/basics/communicate/emails-to-tasks.

Hu, et al., "An Adaptive Recommendation System in Social Media", In Proceedings of 45th Hawaii International Conference on System Sciences, Jan. 4, 2012, pp. 1759-1767.

* cited by examiner

FROM: Anna Vanderbloom

TO: John Roldan

Subject: Upcoming Security Conference

Hi John,

I have received approval to present our latest security firewall at the upcoming security conference. However, I have not yet been able to finish the required paper. I need help reviewing the conclusions from our intrusion statistics ⟵ 500

Do you have any recommendations?

Best,
Neel

Reviewing Conclusions from Intrusion Statistics — 600

Here are people who can help you — 604

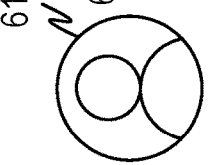

Jaclyn McClure — 606
Program Manager II in the Security Compliance Group
- plays League of Legends with John Roldan — 608
- routinely answers questions regarding security intrusions — 610

612

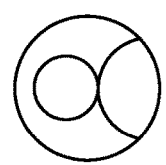

Maureen Glover
Security Architect
- recruited John Roldan to Contoso
- published author on security topics

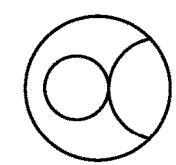

Robert Hale
Director of Software Security
- Heads the software security group at Contoso
- acknowledged expert in software security at Contoso

INTELLIGENT ASSISTANT HELP SYSTEM

FIELD

This application relates generally to intelligent help systems. More specifically, embodiments disclosed herein integrate with email, digital assistant, and other applications and recognize when a user can utilize the help of an expert with a task and provides mechanisms to connect the user with an expert.

BACKGROUND

Digital assistants have been making inroads in various aspects of people's lives. The purpose of these digital assistants is to make the life of the user easier by automating and performing various tasks on behalf of the user. However, there are numerous situations where the user could utilize help of an expert, but either do not know that such an expert exists or do not know how to approach them.

It is within this context that the present disclosure arises.

BRIEF DESCRIPTION OF DRAWINGS

FIG. 5 illustrates an example user interface to indicate to a user that the system can provide expert help.

FIG. 6 illustrates an example user interface that presents expert information to a user.

DETAILED DESCRIPTION

Figure 1:
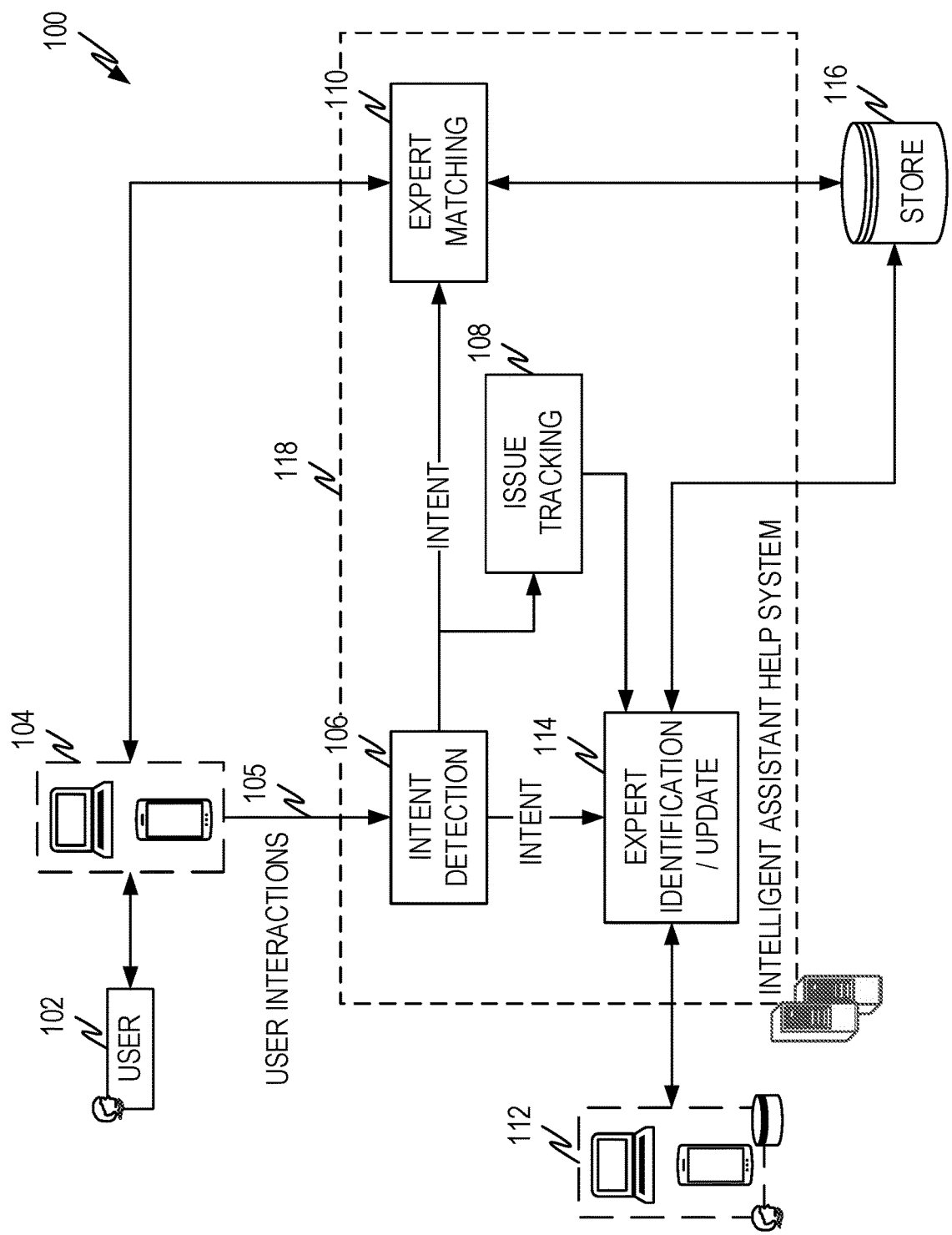
FIG. 1 illustrates an example architecture of a system to detect that a user needs help.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

When users are attempting to solve a problem or initiate a task, they often reach out to those they know on a first or second degree and attempt to leverage those connections to either solve their problem or have those connections introduce them to someone who is more qualified. Furthermore, users are often unaware of someone that has qualifications or could help solve the problem. Even if they are aware of someone that has qualifications or could help solve the problem, they often refrain from asking because they feel awkward "cold calling" strangers to ask for help. On top of that, it is often very difficult for users to articulate exactly who they need to solve a problem, or they do not understand what problem needs to be solved.

The system and other embodiments described herein integrate with, or work in conjunction with, programs, devices and systems that a user interacts with such as email, a digital assistant, word processor, or other programs to monitor user interactions and provide help in proactive situations to identify not only who might be able to help solve an issue, but also understand how an approach to the person might be made. Thus, the system affords a way for the user to understand their connection to individuals who can provide help, the possible opportunities when connecting with each individual and a way to reach out to them directly.

The system incorporates solutions to several difficult technical problems. The first is how to identify when users need help (i.e., when they initiate a task or need help to solve a problem). Another is how to assemble a database of experts who can help with various tasks within one or more areas of expertise. Yet another is how to take an articulation made by a user and match it to a structured database of experts to identify experts who possess the expertise to help the user. Another technical problem is how to identify what information to present to a user once an expert is located. Still another is how to track the outcome of whatever help the expert provides to the user, such as how to tell when a task is completed and whether the outcome was satisfactory (i.e., did the problem get resolved satisfactorily and did the expert provide the needed help). The technical solutions to one or more of these technical problems are utilized in various embodiments disclosed herein. Furthermore, the technical solutions in various combinations transform a traditionally subjective process into a non-subjective automated process that can be executed on systems.

Embodiments use natural language processing coupled to other processes to identify a user intent to initiate a task or request help. In this context, an intent is something the user intends to accomplish or an indication that the user would like help. User intent can be derived by monitoring user interactions with programs or applications such as email, text, chat, a web browser, and so forth. Intents reside in one or more domains, based on the type of event/activity they are intended to trigger. Language understanding models/natural language processing convert text, voice and other user interactions into one or more intents. This can be accomplished as indicated below by extracting features from the interactions and presenting the features to an engine which derives user intent.

Embodiments assemble a database of profiles for experts who can help with various tasks within one or more areas of expertise. Each profile comprises information that describes the area(s) of expertise of the associated expert and information that allows areas of commonality between the expert and a user to be identified. Areas of expertise can be described in a variety of ways. For example, a taxonomy or other canonical representation of areas of expertise can be developed and experts can have an associated expert rating in one or more of the categories. The rating can be a binary rating (i.e., I/O, has expertise/doesn't have expertise, etc.) or can be a rating on a scale (i.e., 1 to 5 stars, 0-1, 0-10, etc.) or some other rating scale. Areas of commonality can be developed by referencing such items as hobbies, schools attended, places visited, employer, job title/function, social network connections, and so forth. The database can be created and maintained by mining various sources of data, by a nomination process, or any combination thereof.

Matching an articulation made by a user to a structured database of experts (i.e., expert profiles) is a difficult technical problem. Part of the process can be accomplished by the intent detection process discussed above. For example, the articulation by a user is evaluated and one or more intents derived from the articulation as indicated above. The intents can then be mapped to the areas of expertise to be used to select profiles from experts that have the appropriate expertise to help the user. In addition, the experts that have relevant expertise can be further tested for social separation from the user to identify a mechanism to approach the expert.

When a user engages with an expert or someone to help on a project previously identified, the system tracks the outcome of the task/help provided to the user. Some embodiment track the outcome through interactions with the expert or the user. For example, an email exchange between the user and expert can be analyzed to identify whether the user engages with the expert, and whether the task was brought to a successful (or unsuccessful) conclusion. By evaluating the email thread and the exchanges, metrics such as timeliness, satisfaction and other metrics can be gleaned. Similarly, other data sources such as the data files a user and/or expert interacts with, as well as other communication channels can be evaluated to identify outcomes. In some embodiments, the system can engage directly with the user and ask for feedback on whether the ask was completed and whether the user was happy with the help provided by the expert. In yet other embodiments a feedback mechanism can be part of the system, but rather than engaging with the user proactively, the system can utilize information that the user provides, should they decide to provide it through the feedback mechanism. This latter option is a more "reactive" than "proactive" type feature.

Several unique user interfaces can be utilized to notify the user of availability of one or more experts that can help. The system monitors user interactions with programs/apps (email, texting, etc.) and can integrate with these programs to provide notification to the user when the system detects user intent to initiate a task or request help. For example, if the user is drafting an email, the system can highlight a particular phrase to indicate to the user that potential help is available for that task. The system may utilize a gesture (i.e., hovering a pointer over the highlighted phrase, long press on a touch screen or other such gesture) to reveal and/or bring up additional information about the help that is available.

Upon selecting the highlighted phrase (i.e., by a click, touch, press, or other gesture), the system can open another user interface that presents a summary of the top experts that may be able to help the user. When experts are presented, the system provides not only an indication of how the expert can help the user, but also an indication of how the user can approach the expert (i.e., areas of overlap, people in common, etc.).

When an expert from the list is selected, the system can present more detailed information about the expert and the user's relationship to the expert. For example, if the user and expert are separated by a social distance, the user interface can comprise an indication of the separation and show how the user is connected to the expert (i.e., through common acquaintances, through corporate organization, and so forth). In one representative example, the social distance can be presented in summary form with more detail being revealed by a gesture (hovering, selecting, etc.).

The user interface can comprise such a timeline displaying events related to the expert, the user, and/or a third party (i.e., common acquaintance, friend, etc.). The timeline allows the user to see events such as common attendance at events, living/traveling to a common location, conference, and so forth, or other events that show how the user might relate to the expert and/or third party.

The user interface may comprise different areas of overlap, such as common interests, hobbies, locations, schooling, and other common areas of overlap. In presenting areas of overlap the system can provide not only details about the area, but also a numeric representation of the degree of overlap between the individuals. For example, if the area of overlap is sports and the user and expert share a common interest in baseball, cycling and rowing, the specific sports can be listed as well as a numeric rating (i.e., a percentage) to give the user a sense for the degree of overlap.

In addition to a timeline and areas of overlap the user interface can comprise other information that allows a user to know more information about the expert. This information may comprise any information in the expert profile or information about the expert that will help the user identify mechanisms and approaches to contact the expert.

DESCRIPTION

FIG. 1 illustrates an example architecture 100 of a system to detect that a user needs help. A user 102 interacts with one or more devices 104 such as through a program, application, service, and so forth. Collectively these will be referred to as programs. Example programs include but are not limited to email, a digital assistant, chat or texting, spreadsheets, word processors, a search program, web browser, and so forth. These representative programs are channels through which an intelligent assistant help system 118 can detect that a user desires to initiate a task or otherwise needs help that can be provided by an expert. In the context of this disclosure, the term expert refers to someone that has an ability (i.e., expertise) to help. The devices 104 can be any type of device such as a mobile device (mobile phone, wearable, etc.), a portable or semi-portable device (laptop, vehicle, etc.), a non-portable device (i.e., server, desktop, etc.), or any combination thereof.

The system 118 monitors a user's interactions 105 with one or more programs, the context of the user, and other information. The intent detection process 106 detects a user intent (i.e., of user 102) to initiate a task or request help. In this context, an intent is something the user 102 intends to accomplish or an indication that the user would like or could use help. Intents reside in one or more domains, based on the type of event/activity they are intended to trigger. As explained in greater detail below, language understanding models/natural language processing convert text, voice and other user interactions into one or more intents. This can be accomplished as indicated below by extracting features from the interactions and presenting the features to an engine which derives user intent.

The user intent is passed to the expert matching process 110, which searches a database 116 containing expert profiles for experts that can provide help in various areas. As described in greater detail below, the database 116 contains two major categories of information. The first category relates to the expert's experience, expertise, and so forth. This category of information is used to identify experts that can provide help in the domain of the user intent. The second category relates to personal or social information of the expert. This category of information is sued to help the user 102 understand the expert, understand how the expert is related to the user (i.e., through mutual acquaintances and/or connections), and identify how to approach the expert.

Identified experts that have relevant expertise are presented to the user 102, such as by the intelligent assistant help system 118 causing various user interfaces to be presented to the user, as described in greater detail below. The user interfaces comprise information that will allow the user to identify how the expert can help the user and identify how to approach the expert to request help.

The system 118 monitors further interactions by the user 102 to identify further intents and events. For example, the system 118 identifies whether the user 102 engages with one or more experts to help. If a user engages an expert, the system 118 monitors interactions to identify when the task/help is complete and whether the outcome was successful. Thus, intent detection process 106 can also detect a user intent that indicates the user engaged an expert and a user intent that indicates the task is complete and that the expert is no longer helping the user 102. These intents are detected, as described further below, using the language models, feature extraction, and presenting the features to an engine which derives user intent.

The detected user intents are then presented to the issue tracking process 108. When the user 102 engages with an expert, the issue tracking 108 can track a state associated with the task or otherwise track the status of the task. In other words, a task follows a progression. As one representative example:

1. The system 118 identifies that help is available.
2. The system 118 selects one or more experts that can help the user 102 and presents the experts to the user in a manner described herein.
3. The system 118 identifies that the user 102 engages with one or more experts.
4. The system 118 identifies that the one or more experts engage with the user.
5. The system 118 identifies that the task/help is concluded.
6. The system 118 identifies whether the task was brought to a successful conclusion.

Each of these can represent a process operation, an operation in a workflow, or any other such representation. Thus, a task can have different states, status, or otherwise be tracked through the process. The issue tracking 108 can track where a task is in such a representative process. Other embodiments may track tasks differently. In still yet another embodiment, the system 118 does not track a state of a task. In this latter embodiment, the system 118 can operate on detected user intents and take actions based on the user intent, with no need to track a state or workflow. The various intents trigger actions in the system.

As a representative example, when the system 118 identifies a user intent to initiate a task or a user intent where help can be provided, the system 118 selects and presents experts as previously described. As another representative example, the system 118 may or may not identify when an expert is engaged. However, for those embodiments that do track when an expert is engaged by a user 102, the action of a user engaging an expert may impact a rating of the expert. For example, experts that are engaged more often may warrant a higher rating than experts that are engaged less often. In such an embodiment, when the system 118 identifies an intent to engage an expert, the system can adjust the rating of the expert based on the engagement. Experts that are not engaged may also have their ratings adjusted in some embodiments. In yet a further example, when the system 118 identifies that a task has been concluded (i.e., that the expert has finished working with the user), the system 118 can adjust the rating of the expert based on the outcome of the engagement as explained below.

Thus, the issue tracking process 108 can identify further actions to take based on other user intents, such as a user intent indicating engagement of an expert, a user intent indicating finishing of an engagement, and so forth. In some embodiments, the issue tracking process 108 can track the state of the task/engagement. In other embodiments, the issue tracking process 108 does not track some or all of the states of the task/engagement and allows the system to respond appropriately to detected intents, such as by adjusting the ratings of experts.

To create a database 116 of expert profiles, the system 118 mines various sources of data 112 and feedback (i.e., from issue tracking process 108) as explained in greater detail below. These operations are performed by the expert identification/update process 114. The expert identification/update process 114 also adjusts expert ratings/scores as appropriate to reflect explicit or implicit feedback as explained below. Through this process, the intelligent assistant help system 118 creates and maintains the expert profile information that is used by the system 118.

Figure 2:
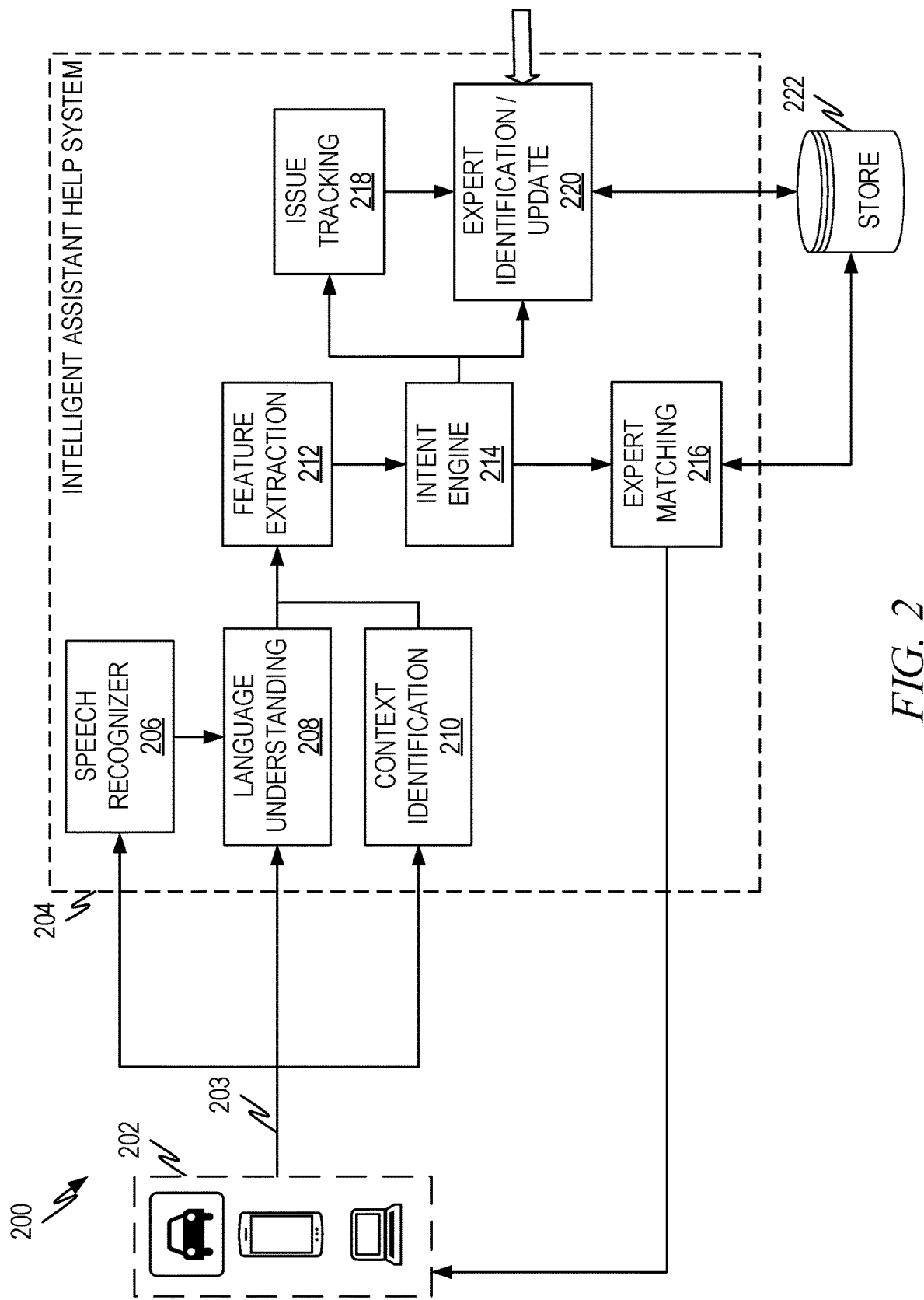
FIG. 2 illustrates another example architecture of a system to detect that a user needs help.

FIG. 2 illustrates another example architecture 200 of a system to detect that a user needs help. This embodiment explains in greater detail how intent detection, such as that performed by intent detection process 106 is performed. As previously described, a user interacts with program(s) on devices 202 and the user interactions 203 are forwarded to the intelligent assistant help system 204 where the user intents are determined.

Since user interactions 203 can be in a variety of forms and formats such as text, verbal, gesture, motion (i.e., such as eye tracking or other body motion), and so forth, the user interactions 203 may need to be converted to a format that the system 204 can process. For example, verbal communication may be converted to text by speech recognizer 206 using any number of well-known algorithms. The resulting text can be passed to language understanding model 208 where the semantic understanding can be extracted from the language. In other words, the language model 208 extracts meaning from the input text. Additionally, or alternatively, the language understanding model 208 can extract words and phrases and place the input text into a format for the feature extraction process 212. Several algorithms are known and can be used as the language understanding model 208. Additionally, or alternatively, language understanding is provided as a service that can be incorporated into systems, such as the Language Understanding Intelligent Service (LUIS) provided by Microsoft.

For input and/or interactions that does not need to be converted and/or recognized, such as text input, the input can be input into the language understanding model 208 as indicated. Another example of interactions that may not need to be converted and/or recognized are interactions that deliver information to the user such as web browsing, searching, reading and/or editing documents and so forth. Additionally, the interactions and/or other information such as device location, programs being interacted with, and so forth may be input into a context identification process 210 to identify a context for the user. A context describes information such as where the user is, the device the user is interacting with, the activities engaged in, and so forth. Context information comes either directly from the information or can be derived from the information. For example, a wearable such as a band or watch may measure biometric (heart rate, blood pressure, etc.) and motion data. This data can be used to determine whether a user is sitting, exercising, walking, and so forth and many wearables derive such information from the circuitry within the wearable. Phones and other GPS enable devices provide location information and such information can be used to determine where the user is located. A user's calendar can be used to identify what activity the user is engaged in such as in a meeting, on a flight, traveling and so forth. User interactions 203 with a program can identify what a user is actively doing. Information sources such as these can provide context information that will help identify user intent.

In some embodiments, context information derived by the context identification process 210, language understanding extracted by the language understanding model 208 and/or other data can be presented to a feature extraction process 212 to extract features from which intent can be derived. The feature extraction process 212 reduces the input data to a set of features that are used by the intent engine 214 to identify one or more user intents. Feature extraction can be performed by several well-known algorithms, such as algorithms that reduce the dimensionality of the input data and produce a set of data that represents the important features that will be used to detect intent. In other embodiments, a feature extraction process 212 is not used and the input data is input directly into the intent engine.

Intent engine 214 takes the input data and identifies one or more user intents and, in some embodiments, an expertise domain for the problem being addressed. As indicated above, user intents include, but are not limited to:

1. A user intent that indicates a user is initiating a task.
2. A user intent that indicates a user could use the help of an expert.
3. A user intent that indicates a user has engaged with someone who is not the most qualified and could connect with a more qualified expert.
4. A user intent that indicates a user has engaged with an expert.
5. A user intent that indicates an expert has engaged with a user.
6. A user intent that indicates that the expert has completed the task/help with the user.
7. A user intent that indicates whether the task was brought to a successful/unsuccessful conclusion.

These user intents can be identified from the input data in several ways. For example, the user intent can be identified by matching key words and/or phrases to the user intent. For example, the key phrase "I need help with" can indicate that a user will need help with a task. Such key phrases can include typical phrases that represent a "call to action" which indicate that a task is to be undertaken, help is needed, a request is being made, and so forth. A typical implementation may have a variety of key words and/or key phrases which map to different intents. The input data is scanned to identify matches in the key words and/or key phrases and the associated intent identified.

Additionally, or alternatively, the intent engine 214 can utilize some form of supervised or unsupervised machine learning. The number of machine learning algorithms are vast and most are well known. Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example inputs to make data-driven predictions or decisions expressed as outputs.

Although example embodiments are presented with respect to a few machine-learning tools, the principles presented herein may be applied to other machine-learning tools.

In some example embodiments, different machine-learning algorithms may be used. For example, Logistic Regression (LR), Naive-Bayes, Random Forest (RF), neural networks (NN), Support Vector Machines (SVM), and/or other machine-learning algorithms may be used for identifying user intents from input data and/or for identifying a domain for the problem to be solved (i.e., what type of expertise is needed for the user intent).

In general, there are two types of problems in machine learning: classification problems and regression problems. Classification problems aim at classifying items into one of several categories (for example, identifying whether the input data maps to one or more user intents). Regression algorithms aim at quantifying some items (for example, by providing a value that is a real number). In some embodiments example machine learning models classify input into a user intent and/or expertise domain. In some embodiments example machine-learning algorithms provide a score (e.g., a number from 1 to 100) to identify a user intent and/or expertise domain. Some machine-learning algorithms utilize training data to find correlations among identified features, and how the feature values affect the outcome.

The identification of user intents and/or expertise domain can be either a classification problem or a regression problem, or both. For example, to identify a user intent, a machine learning algorithm that classifies information can identify whether the input data classifies into one or more user intents. In another example, if the input data has key words and/or key phrases that describe the type of help, task, etc. the user is initiating and/or needs, then machine learning algorithms can be used to identify the probability that a key word/phrase matches an expertise domain. Additionally, or alternatively, either of these two problems could be expressed as a classification problem or a similarity problem and thus appropriate machine learning models can be applied to either the intent identification or expertise domain identification problem.

Furthermore, tools exist that find similarities among words by creating a vector for each word such that words with similar meanings have vectors near each other. A representative example is the Word2vec tool used to perform semantic analysis, but other tools such as Gensim, Latent Dirichlet Allocation (LDA), or tensor flow could also be used.

When the intent engine 214 identifies an intent that indicates a user needs help or is initiating a task, the expert matching process 216 utilizes one or more identified expert domains to select and present one or more experts with expertise in the relevant domain to the user. This process is explained in greater detail below.

When the intent engine 214 identifies a user intent that: a user has engaged with an expert; an expert has engaged with a user; an expert has completed the task/help for the user; the task was brought to a successful/unsuccessful conclusion, the intent can be passed to the issue tracking process 218 (if the embodiment uses one) and/or to the expert identification and update process. These user intents indicate that a state associated with the task can be updated (if the system tracks state), that a rating of the expert can be updated and/or that other actions can be taken as described below.

Figure 3:
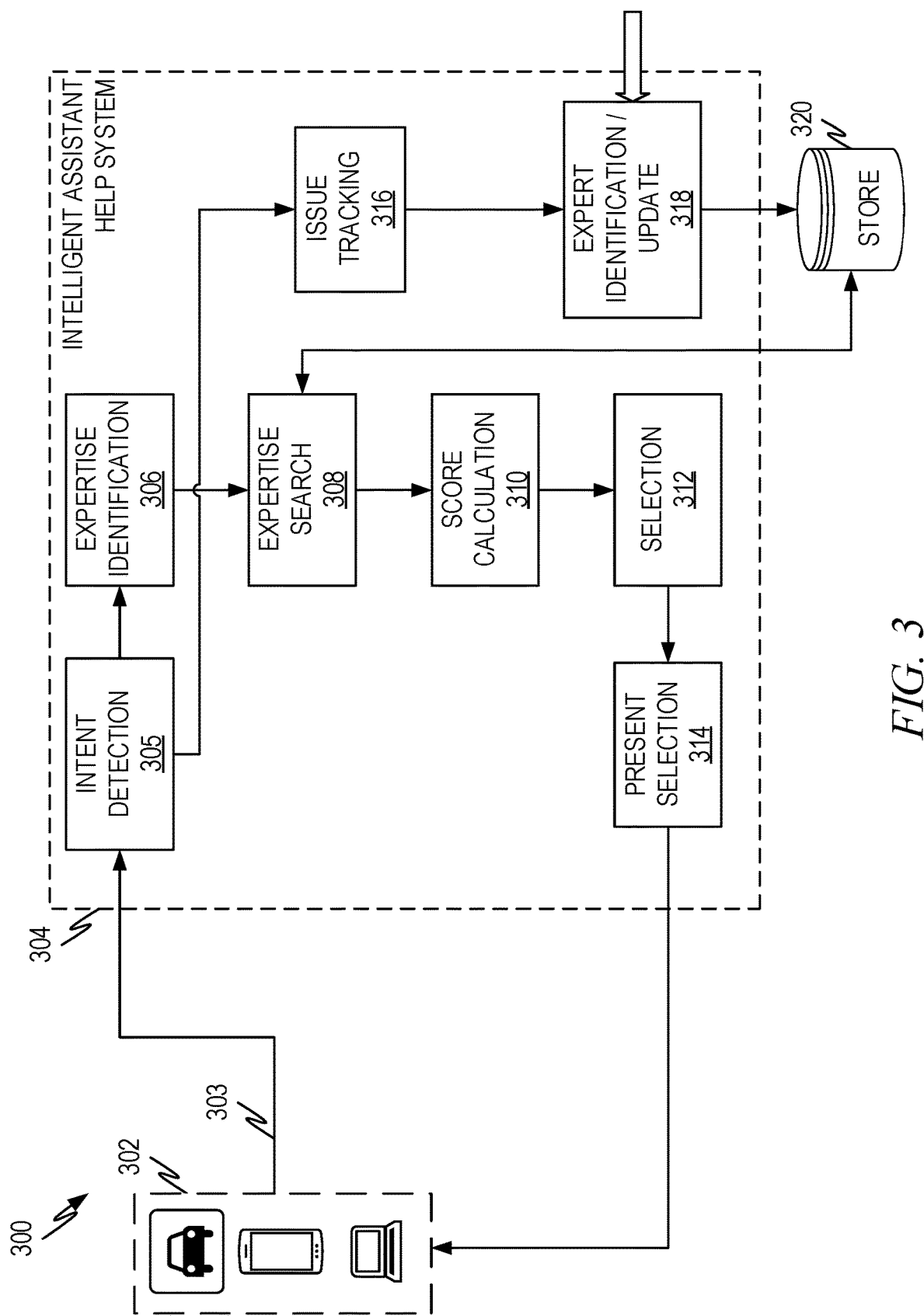
FIG. 3 illustrates an example architecture to identify an expert that can help.

FIG. 3 illustrates an example architecture 300 to identify an expert that can help. The architecture illustrates an expert matching process in greater detail, such as the expert matching process 216 of FIG. 2 or the expert matching process 110 of FIG. 1. The expert matching process is utilized when the user intent that indicates that a user wants to initiate a task and/or the user intent that indicates that a user needs help. The expert matching process takes as an input one or more expertise domains. As explained above, when a user needs help or initiates a task, the user intent has an associated domain. The expertise domain is an area of expertise that allows the intelligent assistant help system 304 to identify experts with relevant expertise to help the user. The intent detection process 305 receives user interactions 303 and represents detecting the appropriate user intent that triggers the expert matching process and the expertise identification process 306 represents identification of the expertise domain(s) associated with the intent. These can be implemented as part of the overall intent detection process as described above in FIG. 2 by matching key words and key phrases to intents and/or expertise domains and/or by utilization of machine learning models associated with machine learning algorithms as previously described.

In identification of expertise domains, it is generally not necessary to identify the specific problem being faced by the user, although in some instances that will be helpful. In most instances, it is often sufficient to understand only the type of problem faced by the user. For example, if the user is faced with choosing a type of restaurant and is texting a friend for recommendations, it may be sufficient for the system 304 to identify experts that are familiar with restaurants generally in the area where the user is located. Thus, the expertise identification process 306 typically identifies expertise domains only to the requisite level of granularity.

Similarly, expertise domains can utilize a hierarchy or be a simple list. Thus, expertise in the legal domain can be listed as a hierarchy of legal expertise, such as a general domain of legal expertise with sub-domains of patent legal expertise, human resources legal expertise and so on, or such a hierarchy can be flattened and used as a list. The expertise domains can be standardized so that a taxonomy of standard expertise domains is developed and maintained or can be more flexible where a plurality of possible descriptions can be used to define an expertise domain. The flexible approach, for example, may represent someone who has event planning expertise as a cluster of alternative descriptors such as "event planning," "event scheduling," "venue scheduling," and so forth. The standardized approach may simply utilize a single descriptor and rely on matching algorithms, machine learning and so forth to ensure that appropriate alternative descriptors match the single descriptor.

Once the appropriate expertise domain(s) have been identified, the expertise search process 308 searches a database 320 of expert profiles for experts that have appropriate expertise. As described in greater detail below, the database 320 contains two major categories of information. The first category relates to the expert's experience, expertise, and so forth. This category of information is used to identify experts that can provide help in the domain of the user intent. The second category relates to personal or social information of the expert. This category of information is sued to help the user understand the expert, understand how the expert is related to the user (i.e., through mutual acquaintances and/or connections), and identify how to approach the expert.

Expert profiles with expertise domains that match the expertise domain that is identified by expertise identification process 306 are retrieved from the database. In this sense, matching the identified expertise domain to profile expertise domain can be accomplished by any methodology that will recognize appropriate similarities. Since the user can describe the help/task in any language they want, such matching accounts for the different ways a user can describe an expertise domain.

For example, in one embodiment the intent detection/expertise identification such as those described in FIG. 2 can map user input into a standardized expertise domain representation. The database 320 then utilizes the same standardized expertise domain representation when creating the expert profiles. The expertise search process 308 is then a simple matching of the identified expertise domain to the expertise domains associated with expert profiles in the database 320.

In another example, the expertise identification process 306 may keep the key words and phrases identified from the user input and those key words/phrases can be matched using a similarity matching algorithm with the expertise domains in the database 320. An identical match would also be a match. Similarity matching can be accomplished in several ways. Machine learning models as previously described can be used to identify expertise domains that are similar. In another embodiment, stemming can be used to reduce words to their stem, base or root form. The root forms can then be compared to identify a match. One suitable implementation would be to store stems in the lists and convert extracted identifiers to their stem for comparison to the stems in the lists. Another suitable implementation would be to stem both identifiers in the lists and extracted identifiers on the fly before comparison. Algorithms to convert words into their stems are well known and need not be repeated herein. Common misspellings, letter transpositions, language differences (such as between British English and American English) and so forth can also be considered when determining matches, stemming and similarity.

If expertise domains are hierarchical in nature, hierarchy can be considered when determining a match. In some embodiments, for identifiers at different category levels, a match is sufficient if one identifier is encompassed by the other. For example, a match between the identifier "sports" is matched by any particular sport (i.e., "cycling" or "baseball"). Such a match can be identified, for example, by a taxonomy of categories/identifiers, a relationship structure, or by any other such mechanism.

Once the expertise search process 308 identifies experts with appropriate domain expertise, the score calculation process 310 calculates scores to rank the experts for selection. In one embodiment, two scores are calculated. The first score is an expertise score and the second score is a social score.

The expertise score can be calculated in different ways. In one embodiment, the expertise score is based on the how high up in the organization an expert is. For example, the organization chart of an organization can be used to identify different levels in the organization and a score assigned to each level in the organization. Additionally, or alternatively, scores can be assigned to titles in an organization. As yet another example, an score representing a user's expertise in a particular domain can be assigned independent of the title/level in the organization. In these situations, scores can be based on education level, responsibilities in an organization, the type of documents handled, edited, created by the expert, posts created in online forums, and so forth. In one embodiment, an initial score is estimated based on title, level in the organization, education level, responsibilities, etc. and then as users interact with the experts, the system can adjust scores up and down based on successful/unsuccessful completion of an engagement, explicit feedback and/or other factors such as whether uses decide to engage an expert, responsiveness of the expert and so forth.

When assigning initial scores, a score can be assigned to each type of data used and the initial score can be calculated as a weighted sum of the individual scores. For example, education level may assign higher scores for higher degrees that are relevant to the domain some someone with a master's degree may be scored higher than someone with a bachelor's degree. Hierarchy in the organization can be scored similarly with higher levels in the organization being assigned higher scores. Responsibility can be scored by assigning higher scores for greater responsibility and/or more relevant responsibility.

Scores can be adjusted up or down by adding and/or subtracting amounts for different events. For example, if a user decides to engage an expert, the expert's expertise domain score can be incremented by a first amount. If the expert is timely, the expertise domain score can be incremented by a second amount. If the engagement is brought to a successful conclusion, the expertise domain score can be incremented by a third amount, and so forth. The relative amounts can be adjusted to reflect which of the factors (timeliness, engagement or successful conclusion) is valued more than the other remaining factors.

Social score can be calculated based on degrees of social separation between the expert and the expert. Thus, an expert that is a level 1 connection (i.e., directly known or connected in a social network to one another) can be assigned a higher score than a level 2 connection and so forth. Other factors that may be included when calculating a social score is areas of overlap or commonality (see discussion below). Thus, the more in common the user has with the expert, the higher score that can be assigned. One way to implement this is to calculate areas/items of overlap and assign points for each area/item, perhaps limited to some maximum and/or minimum value. The social score can be a weighted sum of all the factors used to calculate the social score.

Some scores can be pre-calculated while others need to wait until the expert is identified to be calculated. For example, expertise scores do not depend on which user is making the request and so can be pre-calculated. For systems that adjust expertise scores based on user engagements, feedback and so forth, the initial scores can be pre-calculated and the adjustments made based on engagement factors. Social scores, however, can depend on which user is making the request and thus are calculated on a per-user basis. For example, social distance is not known until the user is known. Thus, such scores can be calculated when the user makes the request. In the alternative, for a closed set of people, such as employees in a company, a social distance can be pre-calculated since the experts are known and the body of people who can possibly make a request are known (i.e., all are employed at the company).

The data to calculate the scores can be stored in the database 320 or can be accessed/retrieved/mined from other data sources. For example, if the user and the expert are part of a social network, the social network information can be used to calculate social distance. In other embodiments, the system maintains its own social connection information, which can be drawn from multiple social networks, a corporate database, and/or other sources and correlated into social connection information stored in the database 320.

Once the experts are identified and the expertise score and social score calculated, the selection process 312 selects the experts per some selection criteria. In one embodiment, the experts are ranked and the top N experts are selected.

The experts can be ranked by the expertise score or the social score or a combination of both. In some embodiments, the combination means ranking first by one score (i.e., social or expertise) and then by the other score (expertise or social). For example, experts can be ranked first by social score and then by expertise score or vice versa. In other embodiments the combination means a mathematical combination of the expertise score and the social score. For example, a ranking score can be calculated as the weighted sum of the expertise score and the social score.

In calculating any scores described herein, scores can be normalized to some defined interval like 0-100 or 0-10.

Once the experts are ranked the top N experts can be selected. In one embodiment N is a relatively small number such as three.

The selected experts are presented to the user by either sending the data back to the user device and presenting the data via one or more user interfaces created on the device using the data, or the system itself can create a user interface such as a web page and send the user interface to the device. In either case, the intelligent assistant help system causes a user interface with the selected experts to be presented to the user. This process is illustrated in FIG. 3 by present selection process 314. Example user interfaces are discussed below.

The issue tracking process 316 and expert identification/update process 318 perform the functions described above and/or below.

Figure 4:
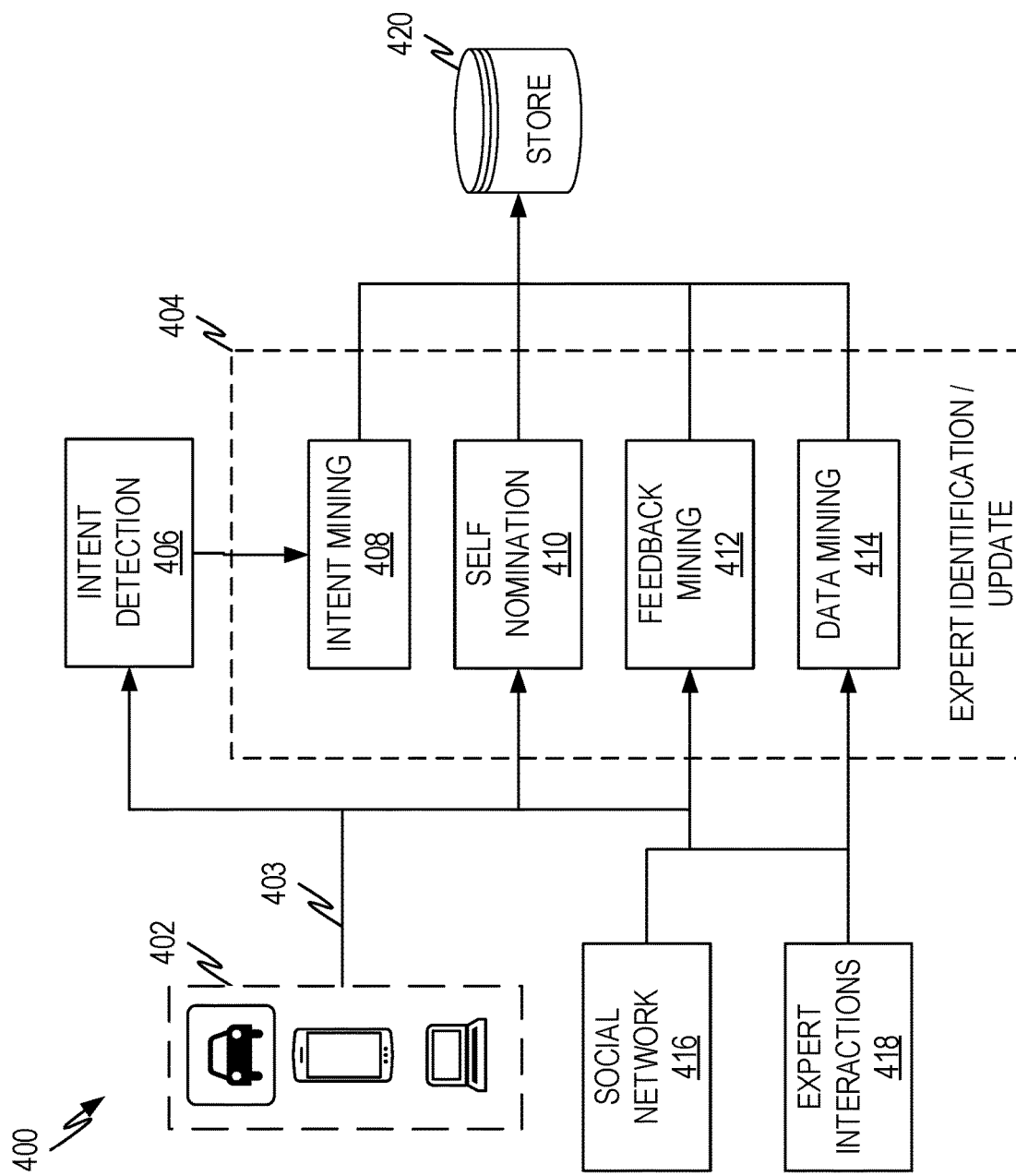
FIG. 4 illustrates an example architecture to identify and update a database of experts.

FIG. 4 illustrates an example architecture 400 to create and update a database of experts 420. This architecture 400 does not illustrate the other aspects of an intelligent assistant help system, such as intent detection, issue tracking, expert matching and other such processes that have been discussed above. However, the expert identification and update process 404 described herein can be utilized in any of the other architectures discussed herein.

Identifying a database of experts is performed by accepting self-nominated experts, by locating experts based on a variety of criteria as explained herein, or by a combination thereof. For example, self-nomination process 410 can be used to identify self-nominated experts. Self-nomination can occur by providing functionality, through a user interface, that allows a user to enter appropriate self-nomination information to be included in the database of experts 420. The user interface can be presented, for example, through a website (i.e., a web page), through an application, or by any combination thereof. The user interface can provide a set of required and/or optional fields that the user can fill out to be included. For example, basic information such as name, contact information, expertise domains, and so forth can be collected. The self-nomination process can also ask the expert for permission to mine information from a social network 416, company database (not shown) and other sources of information in lieu of, or in addition to, having the user enter the information.

Experts can also be identified through having others nominate the expert and having the intelligent assistant help system send the nominated expert a link to enter information into the database.

In addition to self and/or other nomination of experts, the system can mine various databases and data sources for possible experts. This is represented by data mining process 414. For example, documents that potential experts create, interact with, read, and so forth can be examined to identify subject matter that would indicate one or more expertise domains. One suitable implementation may be to examine the impact and/or number of documents created, read, edited, etc. and use that to identify potential experts in expertise domains associated with the documents. A prolific document creator, editor, reviewer, etc. is more likely to have domain expertise than someone who creates, edits, reviews, fewer documents. A program like Microsoft Delve tracks documents and other activities of a user and can be mined for information that can be used to identify experts.

Known methods exist to identify the subject matter of a corpus of documents. For example, document summaries can be examined for key words and phrases that indicate expertise domains. Other known methods exist to summarize and/or identify subject areas of a document or corpus of documents and these can also be used to identify expertise domains associated with a document or corpus of documents.

Other data sources such as social network interactions can be mined to identify experts and associated expertise domains. For example, social networks allow creation, sharing and commenting on documents, and other content. Many social networks measure the "impact" a user has by tracking the number of times a document, comment, or other content is reposted, shared, liked, and other such indicators. Such information can be mined to identify high impact users and the content they create can be used to identify expertise domains.

User interactions 403 (i.e., through devices 402) can also be mined for indicators that point to experts and their expertise domains. People that are asked and/or answer a lot of questions can be identified as experts. Traffic analysis along with analysis of the content of emails can identify experts and their expertise domains. Content analysis can be performed similar to the intent detection above by looking for indicators (i.e., through word/phrase matching, machine learning models, etc.) that questions are asked and/or answered. Traffic analysis can comprise analysis of the raw numbers of mail received and replies sent as well as who the mail was received from and sent to.

Expertise scores can be calculated for expert domains as previously described.

As information is collected, an expert profile for the expert can be created in the database 420. In some embodiments, some information is stored in the database while other information is referenced, retrieved from, etc. another data source such as a user profile, social media database, employer database, and so forth. Thus, all the fields listed under a user profile do not need to be stored in the database 420. An expert profile can comprise one or more of the following:

1. Expert identification information (name, alias, etc.).
2. Preferred method of contact (email, phone, text, etc.).
3. Expertise domain(s).
4. Expertise domain score(s).
5. Event information such as schools attended, countries traveled to, conferences attended, and so forth.
6. Hobbies, interests, likes, dislikes, and so forth.
7. Hometown, employer, past employers, and other such information.
8. Social connections.
9. Feedback regarding expertise, timeliness, etc.
10. Other data/information from which areas of commonality, areas of expertise, expertise scores, social scores, and methods of contact can be derived.

As previously described, in some embodiments the system tracks feedback, either as feedback or as reflected in an expertise score, or both. Thus, intents detected by an intent detection process 406 such as those described above can be mined to adjust scores up and down and/or to identify feedback that can be used to adjust scores up and down. For example expertise scores may be adjusted when a user intent indicates an expert was engaged, when a user intent indicates successful completion of an engagement and so forth. The user intents are detected by the user intent detection process 406 and the scores can be adjusted as described herein by the intent mining process 408. Additionally, or alternatively, the intent mining process can identify how much to adjust the scores, i.e., based on the feedback and/or collect implicit feedback from user interactions 403 associated with the intent, such as by extracting text phrases from the interaction. For example, if the user sends a reply to the expert that says, "Thank you for your help. You have shortened our time to market by several months." The system can extract the feedback "shorten time to market by several months" and place it in a feedback field.

Feedback can also be mined directly from user interactions (i.e., with devices 402), from social networks 416, expert interactions 418 and/or from other sources. Feedback mining process 412 extracts feedback from these sources, such as by looking for key words and phrases and evaluating the text surrounding the key words/phrases for indicators of feedback. Grammatic and/or semantic analysis, such as described above, can be used to help in this process.

Figure 7:
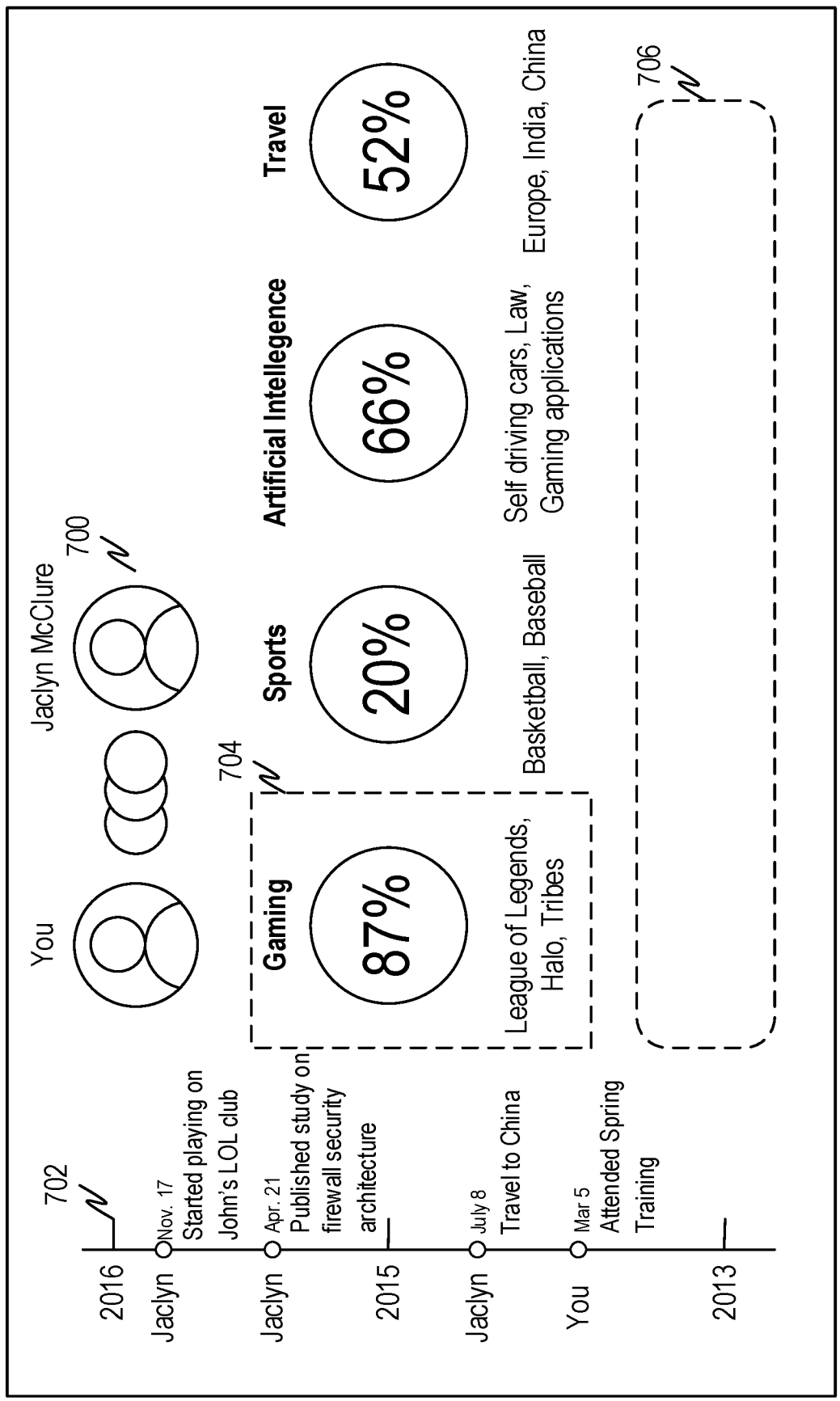
FIG. 7 illustrates an example user interface showing areas of commonality between an expert and a user.

FIGS. 5-7 illustrate example user interfaces that can be used to show how embodiments of the intelligent assistant help system operate in conjunction with a program such as email. The user interfaces represent how data can be presented and how user selections can be received from the system. Although the examples are presented in the context of an email system, similar information can be presented by similar user interfaces in other programs.

FIG. 5 illustrates an example user interface to indicate to a user that the system can provide expert help. The user interface is provided by an email program and a user, Anna Vanderbloom, is drafting an email to John Roldan about an upcoming security conference. As the user drafts the email, the intelligent assistant help system monitors the interactions with the email program and as the text is typed, identifies a user intent indicating a user needs help. In this situation, the user used the phrase "I need help" which the system can recognize as a key phrase through one of the mechanisms described above.

In response to recognizing the user intent, the system also identifies the expertise domain which is related to the phrase "reviewing the conclusions from our intrusion statistics." This phrase may lead the system to identify the expertise domain of "security" or more specifically, "computer security." The system then highlights the relevant phrase 500 or otherwise indicates to the user that help is available for the task indicated by that phrase.

At this point the user can ignore the highlight or can activate the highlight such as by clicking, selecting or other gesture to indicate selection. Additionally, or alternatively, the system may provide more information through a different gesture prior to activation such as through hovering a cursor over the highlight, long press on a touch screen, force press on a touch screen or some other gesture indicating the user would like more information.

In response to activation of the highlight, the system can search for experts with the appropriate domain expertise in the expert database and select a subset to present to the user as previously described.

FIG. 6 illustrates an example user interface that presents expert information to a user in response to activation of the highlight. The user interface has one area 600 where the subject that the users can help with is presented. In this case, the highlighted text from the email is reproduced and placed there.

Additionally a list of the selected experts are presented. In this case, the list includes Jaclyn McClure, Maureen Glover and Robert Hale. Each entry in the list comprises the expert's name 604, their title 606, their photo or other identifier 612 and a few summary facts 608, 610 that describe the expert's social connection to the user, high level facts about the expert, or other information that allows the user to get a sense of what the expert might be able to do for the user.

The experts are presented in ranked order as previously described.

The user can select an expert to gather further details that will help the user identify how to approach the expert and/or gain a greater understanding of how the expert can help.

FIG. 7 illustrates an example user interface showing areas of commonality between an expert and a user. The user interface comprises an indication 700 of the social connection between the user and the expert. In this case the user and the expert are shown as well as the individuals between the user and the expert, starting with the user's first level connections. In some embodiments, the user can expand this information by selecting this indication and/or perform further interactions such as clicking on an intermediary to ask for an introduction, and so forth.

The user interface also comprises a timeline 702 that shows events from the user's life, the experts life and/or from a third party's life. In this case, each event is labeled with the individual, a data, and a description. By examining the timeline 702, the user can identify events that the user, the expert and/or a third party have in common.

The user interface also comprises a plurality of areas of overlap 704. The areas of overlap comprise a numeric score and a list of the items of overlap. For example, the numeric score for the gaming area is 87% and the games the user and the expert have in common are League of Legends®, Halo® and Tribes®.

The user interface can also comprise an area 706 where additional information about the expert can be presented. For example, this area can comprise interests, hobbies, and so forth that the expert does not have in common with the user but which may be of interest to the user and help the user get a sense for the expert.

The information presented in FIG. 7 is social in nature and is designed to allow the user to feel comfortable with the expert to give the user more confidence to approach the expert and ask for help. A similar user interface can be presented that would focus on the expertise of the expert and present such information as areas of expertise, expertise ratings for areas of expertise, accomplishments, feedback, and so forth.

Example Machine Architecture and Machine-Readable Medium

Figure 8:
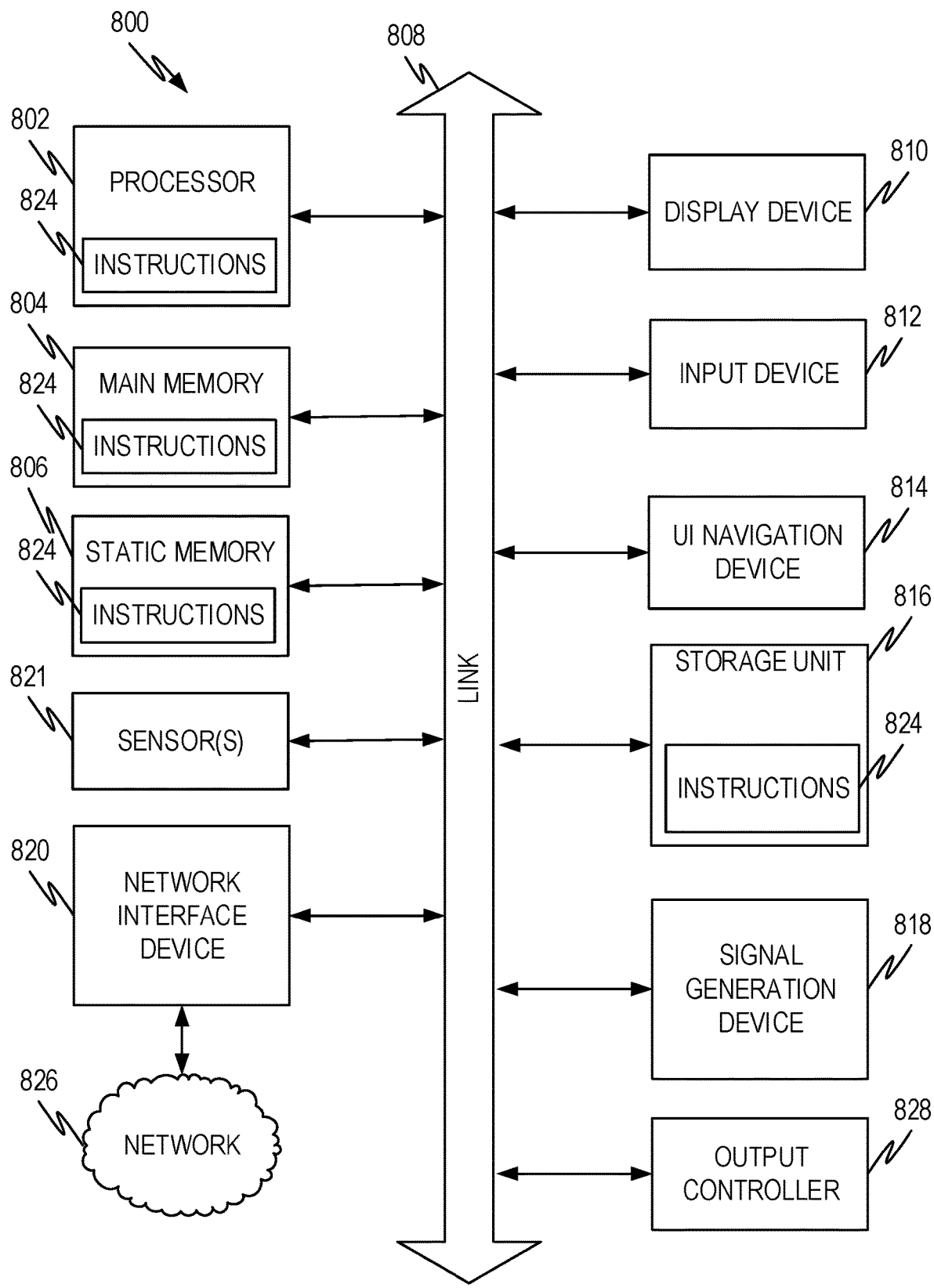
FIG. 8 illustrates a representative machine architecture suitable for implementing the systems and so forth or for executing the methods disclosed herein.

FIG. 8 illustrates a representative machine architecture suitable for implementing the systems and so forth or for executing the methods disclosed herein. The machine of FIG. 8 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 8 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 800 includes at least one processor 802 (e.g., a central processing unit (CPU), a graphics processing unit (GPU), advanced processing unit (APU), or combinations thereof), one or more memories such as a main memory 804, a static memory 806, or other types of memory, which communicate with each other via link 808. Link 808 may be a bus or other type of connection channel. The machine 800 may include further optional aspects such as a graphics display unit 810 comprising any type of display. The machine 800 may also include other optional aspects such as an alphanumeric input device 812 (e.g., a keyboard, touch screen, and so forth), a user interface (UI) navigation device 814 (e.g., a mouse, trackball, touch device, and so forth), a storage unit 816 (e.g., disk drive or other storage device(s)), a signal generation device 818 (e.g., a speaker), sensor(s) 821 (e.g., global positioning sensor, accelerometer(s), microphone(s), camera(s), and so forth), output controller 828 (e.g., wired or wireless connection to connect and/or communicate with one or more other devices such as a universal serial bus (USB), near field communication (NFC), infrared (IR), serial/parallel bus, etc.), and a network interface device 820 (e.g., wired and/or wireless) to connect to and/or communicate over one or more networks 826.

Executable Instructions and Machine-Readable Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-readable medium," "computer-readable medium" and "device-readable medium" mean the same thing and may be used interchangeably in this disclosure. The terms include a single medium or multiple media (e.g., a centralized or distributed database, and/or associated caches and servers) that store the one or more instructions or data structures. The terms shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The terms shall accordingly be taken to include, but not be limited to, solid-state memories, and optical and magnetic media. Specific examples of machine-readable media, computer-readable media and/or device-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The terms machine-readable media, computer-readable media, and device-readable media specifically exclude non-statutory signals per se, which are covered under the term "signal medium" discussed below.

Signal Medium

The term "signal medium" shall be taken to include any form of modulated data signal and signals per se. The term "modulated data signal" means a signal that has one or more of its characteristics set or changed in such a matter as to encode information in the signal.

EXAMPLE EMBODIMENTS

Example 1

A method comprising:
receiving, from at least one user device, user interactions (105, 203, 303, 403) with at least one program;
extracting from the user interactions an intent (106, 214, 305, 406) comprising information related to a category of problem;
searching a database (116, 222, 320, 420) based on the information and extracting at least one profile describing at least one expert with expertise related to the category of problem;
for each profile:
identifying an expertise score (310) and a social score (310) for the expert;
combining the expertise score and the social score into a ranking score (310);
associating the ranking score with the expert corresponding to the profile;
ranking each expert according to the ranking score;
selecting one or more experts based on the ranking (312); and
causing presentation of at least one user interface (600, 604, 606, 608, 610, 612) comprising the one or more experts in ranked order and a plurality of attributes describing a relationship to the category of problem, a social connection to a user, or both.

Example 2

The method of example 1, wherein extracting the intent comprises:
parsing the user interactions;
extracting a set of features from the user interactions; and
determining the intent from the set of features.

Example 3

The method of example 2, wherein determining the intent from the set of features comprises identifying an action and information associated with the action.

Example 4

The method of example 2, wherein determining the intent from the set of features comprises at least one of:
identifying a match between at least one feature of the set of features to the intent;
and
presenting the set of features to a model created by a machine learning algorithm and receiving in response the intent.

Example 5

The method of example 1, wherein the information comprises a call to action and information associated with the action.

Example 6

The method of example 1, wherein searching the database based on the information comprises:
deriving, from the information, a category; and
searching the database for expert profiles with an expertise that matches the category.

Example 7

The method of example 1, 2, 3, 4, 5 or 6 wherein:
calculating the expertise score is based on an organizational position of the expert; and
calculating the social score is based on a social distance of the expert from the user.

Example 8

The method of example 1, 2, 3, 4, 5 or 6 wherein the ranking score comprises a weighted sum of the expertise score and the social score.

Example 9

A computing system comprising:
a processor and executable instructions accessible on a machine-readable medium that, when executed, cause the system to perform operations comprising:
receiving, from at least one user device, user interactions (105, 203, 303, 403);
extracting from the user interactions an intent (106, 214, 305, 406) comprising information related to a task;
identifying a category of problem from the information;
searching a database (116, 222, 320, 420) comprising expert profiles and extracting expert profiles with expertise related to the category of problem;
for each profile:
identifying an expertise score (310) and a social score (310); and
ranking each expert according to the expertise score, or the social score or a combination of the expertise score and social score;
selecting one or more experts based on the ranking (312); and
causing presentation of at least one user interface (600, 604, 606, 608, 610, 612) comprising the one or more experts in ranked order and a plurality of attributes describing a relationship to the category of problem, a social connection to a user, or both.

Example 10

The system of example 9, further comprising:
receiving additional user interactions;
extracting from the additional user interactions an intent comprising an indication that the task has been completed and a success indicator;
updating a profile in the database based on the success indicator.

Example 11

The system of example 9, further comprising:
receiving additional user interactions;
extracting from the additional user interactions an intent comprising an indication that the task has been completed;
requesting a success indicator from the user; and
updating a profile in the database based on the success indicator.

Example 12

The system of example 9, 10, or 11 further comprising:
receiving from the user a selection indicating a selected expert of the one or more experts;
presenting a second user interface in response to the selection, the second user interface comprising:
a timeline displaying events associated with the user and events associated with the selected expert;
a plurality of common areas for the selected expert and the user, each common area comprising a numeric indicator specifying a percentage of commonality between the user and the selected expert and a list comprising identifiers in the common area.

Example 13

The system of example 9, 10 or 11, wherein each expert profile in the database comprises:
a name of an associated expert;
at least one area of expertise;
a list of social connections; and
a plurality of attributes related to the associated expert from which areas of commonality can be derived.

Example 14

The system of example 9, 10 or 11, wherein identifying a category of problem from the information comprises identifying at least one key word or phrase associated with the intent and testing for a match between the at least one key word or phrase with a set of categories.

Example 15

The system of example 9, 10 or 11, wherein:
calculating the expertise score is based on an organizational position of the expert; and
calculating the social score is based on a social distance of the expert from the user.

Example 16

The system of example 9, 10 or 11, wherein the combination of the expertise score and social score comprises a weighted sum of the expertise score and the social score.

Example 17

A machine-readable medium having executable instructions encoded thereon, which, when executed by at least one processor of a machine, cause the machine to perform operations comprising:
receiving, from at least one user device, user interactions (105, 203, 303, 403);
extracting from the user interactions an intent (106, 214, 305, 406) comprising information related to task;
identifying a category of problem from the information;
searching a database comprising expert profiles and extracting expert profiles with expertise related to the category of problem;
for each profile:
identifying an expertise score (310) and a social score (310); and
ranking each expert according to the expertise score, or the social score or a combination of the expertise score and social score;
selecting one or more experts based on the ranking; and
causing presentation of at least one user interface (600, 604, 606, 608, 610, 612) comprising the one or more experts in ranked order and a plurality of attributes describing a relationship to the category of problem, a social connection to a user, or both.

Example 18

The machine-readable medium of example 17, further comprising updating or creating an expert profile in the database through at least one of:
mining intent information derived from user interactions;
receiving information from an expert associated with the expert profile;
mining feedback from a social network or interactions between the expert and the user; and
data mining from interactions the expert has with documents or users.

Example 19

The machine-readable medium of example 17, or 18 further comprising updating the expertise score based on feedback gathered from the user, from interactions or both.

Example 20

The machine-readable medium of example 17, or 18 wherein the expertise score is based upon a degree of match between the category of problem and expertise associated with the profile and the social score is based upon a degree of social separation between the user and the expert.

Example 21

A method comprising:
receiving, from at least one user device, user interactions (105, 203, 303, 403) with at least one program;
extracting from the user interactions an intent (106, 214, 305, 406) comprising information related to a category of problem;
searching a database (116, 222, 320, 420) based on the information and extracting at least one profile describing at least one expert with expertise related to the category of problem;

for each profile:
  identifying an expertise score (310) and a social score (310) for the expert;
  combining the expertise score and the social score into a ranking score (310);
  associating the ranking score with the expert corresponding to the profile;
  ranking each expert according to the ranking score;
  selecting one or more experts based on the ranking (312); and
  causing presentation of at least one user interface (600, 604, 606, 608, 610, 612) comprising the one or more experts in ranked order and a plurality of attributes describing a relationship to the category of problem, a social connection to a user, or both.

Example 22

The method of example 21, wherein extracting the intent comprises:
  parsing the user interactions;
  extracting a set of features from the user interactions; and
  determining the intent from the set of features.

Example 23

The method of example 22, wherein determining the intent from the set of features comprises identifying an action and information associated with the action.

Example 24

The method of example 22, wherein determining the intent from the set of features comprises at least one of:
  identifying a match between at least one feature of the set of features to the intent; and
  presenting the set of features to a model created by a machine learning algorithm and receiving in response the intent.

Example 25

The method of example 21, 22, 23, or 24, wherein the information comprises a call to action and information associated with the action.

Example 26

The method of example 21, 22, 23, 24, or 25, wherein searching the database based on the information comprises:
  deriving, from the information, a category; and
  searching the database for expert profiles with an expertise that matches the category.

Example 27

The method of example 21, 22, 23, 24, 25, or 26, wherein:
  calculating the expertise score is based on an organizational position of the expert; and
  calculating the social score is based on a social distance of the expert from the user.

Example 28

The method of example 21, 22, 23, 24, 25, 26 or 27, wherein the ranking score comprises a weighted sum of the expertise score and the social score.

Example 29

The method of example 21, 22, 23, 24, 25, 26, 27, or 28, further comprising:
  receiving additional user interactions;
  extracting from the additional user interactions an intent comprising an indication that the task has been completed and a success indicator;
  updating a profile in the database based on the success indicator.

Example 31

The method of example 21, 22, 23, 24, 25, 26, 27, or 28, further comprising:
  receiving additional user interactions;
  extracting from the additional user interactions an intent comprising an indication that the task has been completed;
  requesting a success indicator from the user; and
  updating a profile in the database based on the success indicator.

Example 32

The method of example 21, 22, 23, 24, 25, 26, 27, 28, 29, 30, or 11, further comprising:
  receiving from the user a selection indicating a selected expert of the one or more experts;
  presenting a second user interface in response to the selection, the second user interface comprising:
    a timeline displaying events associated with the user and events associated with the selected expert;
    a plurality of common areas for the selected expert and the user, each common area comprising a numeric indicator specifying a percentage of commonality between the user and the selected expert and a list comprising identifiers in the common area.

Example 33

The method of example 21, 22, 23, 24, 25, 26, 27, 28, 29, 30, 31, or 32, wherein each expert profile in the database comprises:
  a name of an associated expert;
  at least one area of expertise;
  a list of social connections; and
  a plurality of attributes related to the associated expert from which areas of commonality can be derived.

Example 34

An apparatus comprising means to perform a method as in any preceding example.

Example 35

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method comprising:
receiving, from at least one user device, interactions between a user and at least one program;
extracting from the user interactions an intent;
searching a database based on the intent and extracting at least one profile describing at least one expert with expertise related to a category of a problem;
for each profile:
identifying a pre-calculated expertise score representing a degree of expertise related to the category of the problem;
determining, in response to extracting the intent, a social score representing a degree of social relation between the expert and the user;
combining the pre-calculated expertise score and the social score into a ranking score;
associating the ranking score with the expert corresponding to the profile;
ranking each expert according to the ranking score;
selecting one or more experts based on the ranking;
causing presentation of at least one user interface comprising the one or more experts in ranked order, a plurality of attributes describing a relationship of the one or more experts to the category of problem, and a social connection of the one or more experts to the user;
determining that the user has engaged with a specific expert of the one or more experts for the completion of a task;
receiving feedback from the user, wherein the feedback indicates a level of satisfaction with the specific expert and whether the engagement resulted in successful completion of the task; and
updating the pre-calculated expertise score of the specific expert based on the feedback.

2. The method of claim 1, wherein extracting the intent comprises:
parsing the user interactions;
extracting a set of features from the user interactions; and
determining the intent from the set of features.

3. The method of claim 2, wherein determining the intent from the set of features comprises identifying an action and information associated with the action.

4. The method of claim 2, wherein determining the intent from the set of features comprises at least one of:
identifying a match between at least one feature of the set of features to the intent; and
presenting the set of features to a model created by a machine learning algorithm and receiving in response the intent.

5. The method of claim 1, wherein the intent comprises a call to action and information associated with the action.

6. The method of claim 1, wherein searching the database based on the intent comprises:
deriving, from the intent, the category; and
searching the database for expert profiles with an expertise that matches the category.

7. The method of claim 1, wherein:
calculating the pre-calculated expertise score is based on an organizational position of the expert.

8. The method of claim 1, wherein the ranking score comprises a weighted sum of the pre-calculated expertise score and the social score.

9. A computing system comprising:
a processor and executable instructions accessible on a machine-readable medium that, when executed, cause the system to perform operations comprising:
receiving, from at least one user device, interactions between a user and at least one program;
extracting from the user interactions an intent comprising information related to a task;
identifying a category of problem from the information;
searching a database comprising expert profiles and extracting expert profiles, each profile associated with an expert having expertise related to the category of problem;
for each profile:
identifying a pre-calculated expertise score representing a degree of expertise related to the category of the problem;
determining, in response to extracting the intent, a social score representing a degree of social relation between the expert and the user; and
ranking each expert according to the pre-calculated expertise score, or the social score or a combination of the pre-calculated expertise score and social score;
selecting one or more experts based on the ranking; and
causing presentation of at least one user interface comprising the one or more experts in ranked order, a plurality of attributes describing a relationship of the one or more experts to the category of problem, and a social connection of the one or more experts to the user;
determining that the user has engaged with a specific expert of the one or more experts for the completion of a task;
receiving feedback from the user, wherein the feedback indicates a level of satisfaction with the specific expert and whether the engagement resulted in successful completion of the task; and
updating the pre-calculated expertise score of the specific expert based on the feedback.

10. The system of claim 9, further comprising:
receiving additional user interactions;
extracting from the additional user interactions an intent comprising an indication that the task has been completed and a success indicator; and
updating a profile in the database based on the success indicator.

11. The system of claim 9, further comprising:
receiving additional user interactions;
extracting from the additional user interactions an intent comprising an indication that the task has been completed;
requesting a success indicator from the user; and
updating a profile in the database based on the success indicator.

12. The system of claim 9, further comprising:
receiving from the user a selection indicating a selected expert of the one or more experts;
presenting a second user interface in response to the selection, the second user interface comprising:
a timeline displaying events associated with the user and events associated with the selected expert; and
a plurality of common areas for the selected expert and the user, each common area comprising a numeric indicator specifying a percentage of commonality between the user and the selected expert and a list comprising identifiers in the common area.

13. The system of claim 9, wherein each expert profile in the database comprises:
- a name of an associated expert;
- at least one area of expertise;
- a list of social connections; and
- a plurality of attributes related to the associated expert from which areas of commonality can be derived.

14. The system of claim 9, wherein identifying a category of problem from the information comprises identifying at least one key word or phrase associated with the intent and testing for a match between the at least one key word or phrase with a set of categories.

15. The system of claim 9, wherein:
- calculating the pre-calculated expertise score is based on an organizational position of the expert.

16. The system of claim 9, wherein the combination of the expertise score and social score comprises a weighted sum of the pre-calculated expertise score and the social score.

17. A machine-readable medium, specifically excluding non-statutory signals per se, having executable instructions encoded thereon, which, when executed by at least one processor of a machine, cause the machine to perform operations comprising:
- receiving, from at least one user device, user interactions;
- extracting from the user interactions an intent comprising information related to task;
- identifying a category of problem from the information;
- searching a database comprising expert profiles and extracting expert profiles with expertise related to the category of problem;
- for each profile:
  - identifying a pre-calculated expertise score representing a degree of expertise related to the category of the problem;
  - determining, in response to extracting the intent, a social score representing a degree of social relation between the expert and the user; and
- ranking each expert according to the pre-calculated expertise score, or the social score or a combination of the pre-calculated expertise score and social score;
- selecting one or more experts based on the ranking; and
- causing presentation of at least one user interface comprising the one or more experts in ranked order, a plurality of attributes describing a relationship of the one or more experts to the category of problem, a social connection of the one or more experts to a user, or both;
- determining that the user has engaged with a specific expert of the one or more experts for the completion of a task;
- receiving feedback from the user, wherein the feedback indicates a level of satisfaction with the specific expert and whether the engagement resulted in successful completion of the task; and
- updating the pre-calculated expertise score of the specific expert based on the feedback.

18. The machine-readable medium, specifically excluding non-statutory signals per se, of claim 17, further comprising updating or creating an expert profile in the database through at least one of:
- mining intent information derived from user interactions;
- receiving information from an expert associated with the expert profile;
- mining feedback from a social network or interactions between the expert and the user; and
- data mining from interactions the expert has with documents or users.

19. The machine-readable medium, specifically excluding non-statutory signals per se, of claim 17, wherein the pre-calculated expertise score is based upon a degree of match between the category of problem and expertise associated with the profile and the social score is based upon a degree of social separation between the user and the expert.

* * * * *